A. FRAVEL.
Grain-Drill.
No. 15,210.
2 Sheets—Sheet 1.
Patented June 24, 1856.
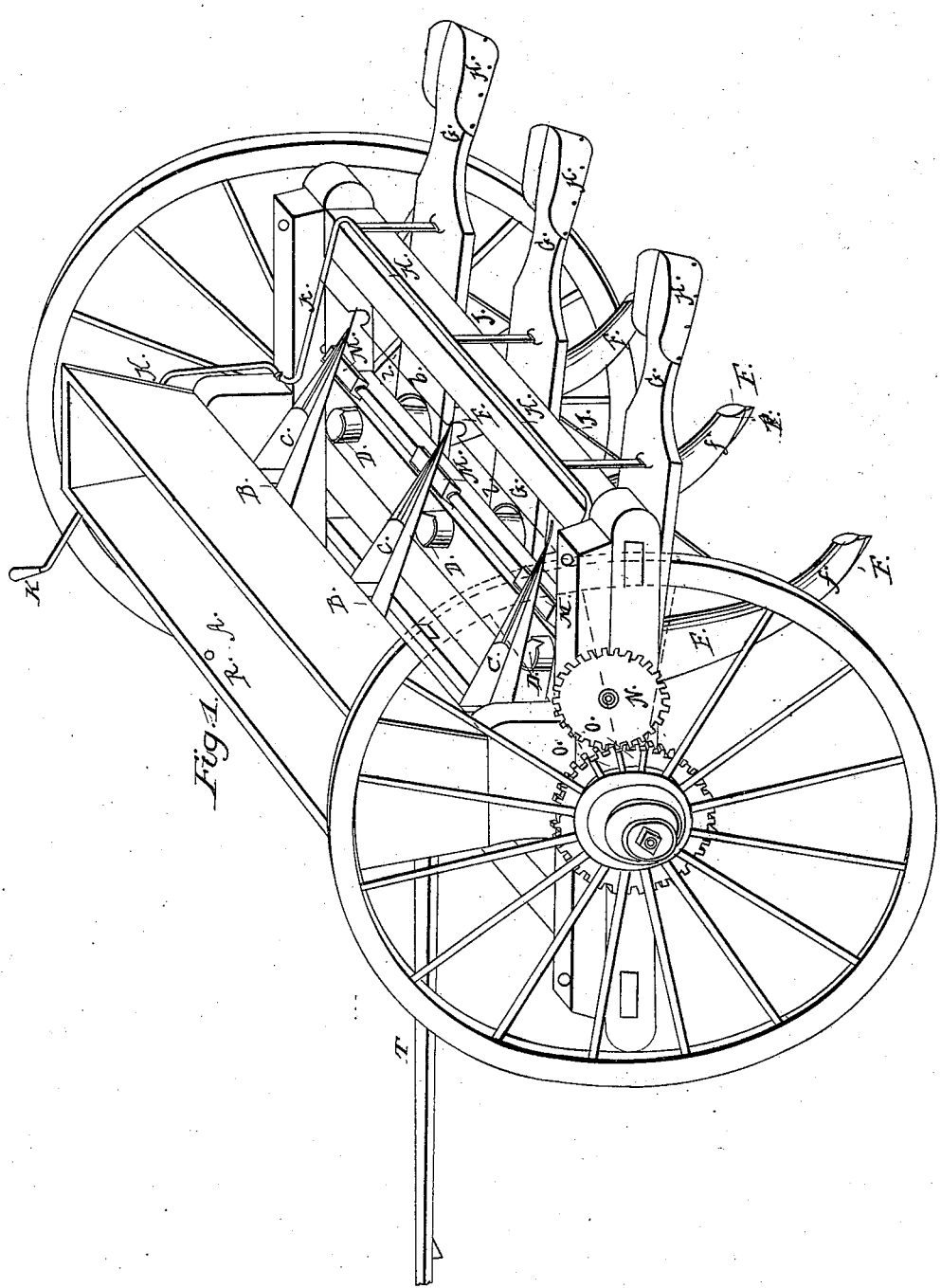

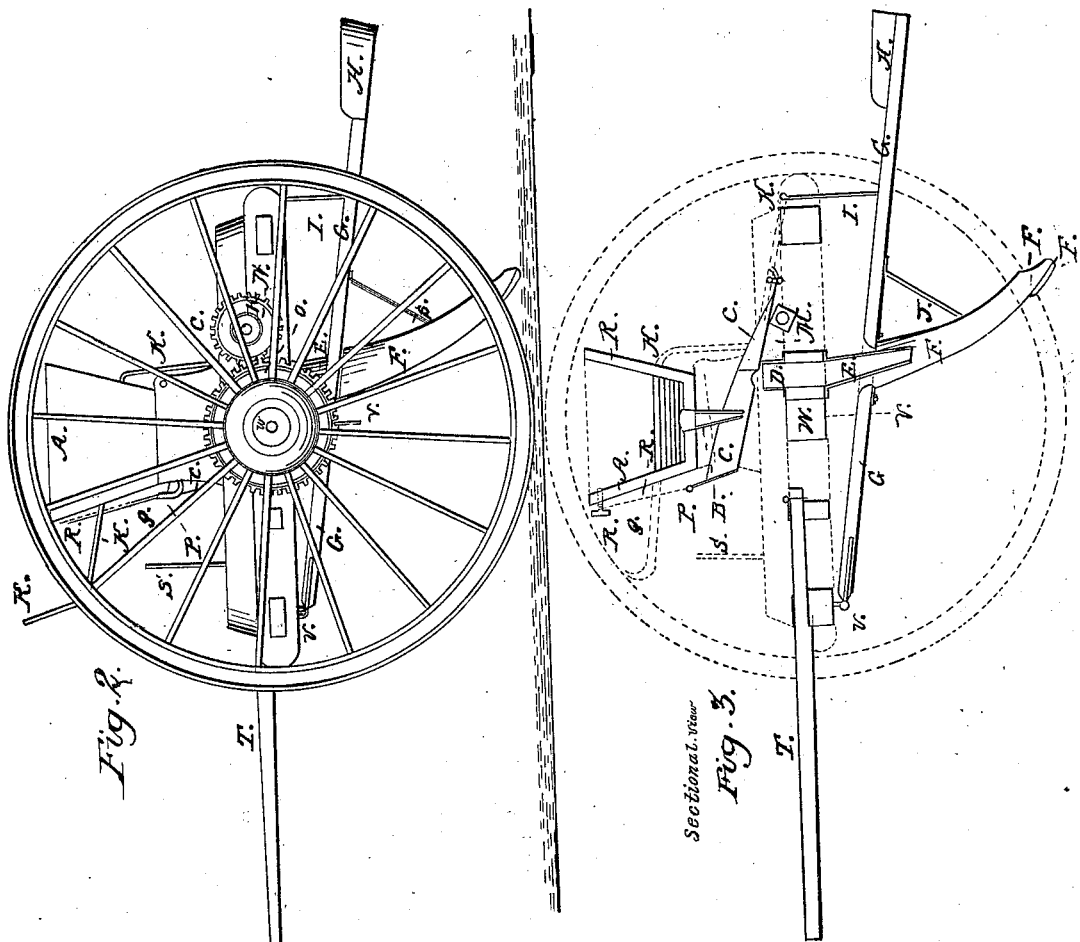

UNITED STATES PATENT OFFICE.

ABRAHAM FRAVEL, OF LA PORTE, INDIANA, ASSIGNOR TO HIMSELF AND THOMAS D. LEMON.

IMPROVEMENT IN GRAIN-DRILLS.

Specification forming part of Letters Patent No. 15,210, dated June 24, 1856.

*To all whom it may concern:*

Be it known that I, ABRAHAM FRAVEL, of La Porte, in the county of La Porte and State of Indiana, have invented certain new and useful Improvements in Grain-Drills; and I do hereby declare that the following is a full, clear, and exact description of the construction and operation of the same, reference being had to the annexed drawings, making a part of this specification, in which—

Figure 1 is a perspective drawing; Fig. 2, a longitudinal elevation, and Fig. 3 a transverse section.

A, Fig. 1, is a hopper to receive the grain; B, spout to lead the grain from the hopper to the shoe; C, a shoe, which may be made of sheet-iron or other proper material. The large end of the shoe is suspended to a rack in front of hopper A, passing back and under same with the point resting on tumblers M. D, guard to prevent waste of grain in passing from the shoe to spout E, which conveys the grain into the reversed tooth F with cutter F'. The teeth may be made of cast-iron or steel, at the pleasure of the manufacturer. G, lever attached to front part of frame-work, to which the tooth F is fastened at the proper place to receive the grain from spout E, and extended back to form box H for the reception of weights, to give the tooth the necessary depth in sod or hard ground; I, straps connecting the lever G with rack K; J, brace for support of tooth. K and L form a double rack, which is governed by their extension for the purpose of elevating the tooth from the ground and the point of the shoe C from the tumblers M, thereby stopping the distribution of the grain and enabling the operator to convey the machine to any desirable distance by the aid of its own wheels. M, square tumblers under and near the point of the shoe C, and attached to a shaft running across the drill, giving a perpendicular motion to the shoe C, which distributes the grain through the guards D; N, a cog-wheel to shaft and tumblers M, which receives its motion from cog-wheel O, attached to the driving-wheel. These cog-wheels may be varied in size sufficient to obtain the necessary motion for the shaft and tumblers M and shoe C. P in Fig. 2, longitudinal elevation, a rack in front of lower part of hopper A, to which the shoe C is attached; Q, a cord or chain to adjust rack P; R, adjusting-pin on front and upper part of hopper A, to adjust the shoe C, thereby regulating the quantity of grain to be sown; S, a hold to secure the lever when the double rack K and L is elevated; T, the tongue to which the team is attached; U, a hinge to attach lever G to front of frame; V, pins of wood or iron, to prevent side motion of lever G; W, axle of wood or iron for driving-wheels.

The peculiar advantages of this arrangement are:

First. The shape and position of the teeth render clogging or breaking impossible, however near together they may be placed. Thus, by making the rows six or seven inches apart, using the same quantity of grain to the acre, the crop would be materially increased, and prevent grass and weeds from growing between the rows.

Second. The grain passing from the shoe C through the guards D is always in sight of the operator, who is seated on the hopper A, between the lever K and the adjusting-pin R, who, by the use of the adjusting-pin R, can regulate the quantity of grain distributed.

Third. By the influence of a single lever, K, which is always in reach of the operator, the entire operation of the drill is suspended, and the machine conveyed on its own wheels to any desirable point.

Fourth. The exceeding light draft, on account of the teeth being reversed.

Fifth. The very desirable advantage of simplicity and cheapness.

What I claim as my invention, and desire to secure by Letters Patent, is—

The combination of tooth F, cutter F', and lever G with shoe C, guard D, and tumbler M, the whole being arranged and operated substantially as shown, for the purpose specified.

ABRAHAM FRAVEL.

Witnesses:
JOHN MILLIKAN,
W. R. GODFREY.